US011917357B2

(12) United States Patent
Zhao et al.

(10) Patent No.: US 11,917,357 B2
(45) Date of Patent: Feb. 27, 2024

(54) EARPIECE

(71) Applicant: YEALINK (XIAMEN) NETWORK TECHNOLOGY CO., LTD., Fujian (CN)

(72) Inventors: Tao Zhao, Fujian (CN); Caifa Huang, Fujian (CN); Kaiwen Huang, Fujian (CN); Canhong Lin, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 94 days.

(21) Appl. No.: 17/719,328

(22) Filed: Apr. 12, 2022

(65) Prior Publication Data

US 2022/0329929 A1 Oct. 13, 2022

(30) Foreign Application Priority Data

Apr. 12, 2021 (CN) ......................... 202110391913.0
Apr. 12, 2021 (CN) ......................... 202120740988.0
Apr. 2, 2022 (CN) ......................... 202220769999.6

(51) Int. Cl.
*H04R 1/10* (2006.01)
*H04R 1/08* (2006.01)

(52) U.S. Cl.
CPC ............. *H04R 1/1075* (2013.01); *H04R 1/08* (2013.01); *H04R 1/1008* (2013.01); *H04R 1/1041* (2013.01); *H04R 2201/107* (2013.01)

(58) Field of Classification Search
CPC . H04R 1/00; H04R 1/028; H04R 1/08; H04R 1/083; H04R 1/10; H04R 1/1008; H04R 1/1041; H04R 1/1075; H04R 2201/107
See application file for complete search history.

(56) References Cited

U.S. PATENT DOCUMENTS 5,999,822 A * 12/1999 Wicks ................. H04M 1/0202 455/575.1
7,349,547 B1 * 3/2008 Isvan ..................... H04R 1/083 379/430
2005/0153748 A1 * 7/2005 Bodley ................... H04M 1/05 455/575.1

(Continued)

FOREIGN PATENT DOCUMENTS

WO WO-2006107274 A1 * 10/2006 ............. H04R 1/083
WO WO-2006129205 A1 * 12/2006 ............. H04R 1/083

*Primary Examiner* — Thang V Tran

(57) ABSTRACT

An earpiece includes a housing, a sound transmission component, a sound reception component, a force application structure and a trigger. A cavity is formed in the housing. The sound transmission component is provided in the cavity. The sound reception component is provided on the housing, and can move along a predetermined path. At least a retracted position and a stretched position are arranged on the predetermined path. The force application structure is connected to the sound reception component, and configured to drive the sound reception component to move to the retracted position or the stretched position. The earpiece in the present disclosure stretches out or retracts the sound reception component automatically. The earpiece in the present disclosure does not need the user to stretch out or retract the sound reception component manually, with good user experience.

19 Claims, 12 Drawing Sheets

(56) References Cited

U.S. PATENT DOCUMENTS

| | | | | |
|---|---|---|---|---|
| 2008/0044002 | A1* | 2/2008 | Bevirt | H04M 1/05 379/430 |
| 2009/0080683 | A1* | 3/2009 | Bevirt | H04M 1/05 381/367 |
| 2010/0040145 | A1* | 2/2010 | Chujoh | H04N 19/176 375/240.15 |
| 2013/0121524 | A1* | 5/2013 | Liao | H04R 1/1075 381/375 |
| 2014/0161296 | A1* | 6/2014 | Andersen | H04R 1/083 381/361 |

* cited by examiner

EARPIECE

CROSS-REFERENCE TO RELATED APPLICATIONS

The present application claims the benefit of Chinese Patent Application Nos. 202110391913.0 and 202120740988.0 filed on Apr. 12, 2021, and 202220769999.6 filed on Apr. 2, 2022, the contents of which are hereby incorporated by reference.

TECHNICAL FIELD

The present disclosure relates to the technical field of earpieces, and in particular to an earpiece.

BACKGROUND

An earpiece is a combination of a sound transmission component and a sound reception component, in which the sound transmission component can convert the electrical signal into the sound signal, and the sound reception component can convert the sound signal into the electrical signal for transmission.

To keep the earpiece integrated and the sound reception component undamaged, the sound reception component in the earpiece usually adopts a concealed structure.

The sound reception component in the present earpiece is stretched out or retracted manually with the poor user experience.

SUMMARY

An objective of the present disclosure is to provide an earpiece capable of improving the user experience, while not stretching out or retracting the sound reception component manually.

To achieve the above-mentioned objective, the present disclosure provides an earpiece, including a housing, a sound transmission component, a sound reception component, a force application structure and a trigger, where a cavity is formed in the housing; the sound transmission component is provided in the cavity; the sound reception component is provided on the housing, and can move along a predetermined path; at least a retracted position and a stretched position are arranged on the predetermined path; the force application structure is connected to the sound reception component, and configured to drive the sound reception component to move to the retracted position or the stretched position; and the trigger is connected to the force application structure, and configured to start the force application structure, such that the force application structure drives the sound reception component.

The earpiece provided by some embodiments of the present disclosure has the following beneficial effects over the prior art:

When the sound reception component is not used, the force application structure can be started by the trigger, such that the force application structure automatically drives the sound reception component to move to the retracted position. When the sound reception component is used, the force application structure can be started by the trigger, such that the force application structure automatically drives the sound reception component to move to the stretched position. The earpiece in some embodiments stretches out or retracts the sound reception component automatically. Compared with an earpiece in which the sound reception component is stretched out or retracted manually by the user to cause the poor user experience in the prior art, the earpiece in some embodiments does not need the user to stretch out or retract the sound reception component manually, with the good user experience.

According to the above earpiece, the trigger may include a movable seat; the sound reception component may be provided on the movable seat; the movable seat may move with the sound reception component; when the sound reception component moves between the retracted position and the stretched position, the movable seat may pass through a triggering position; when the sound reception component moves to the stretched position and the movable seat passes through the triggering position, the force application structure may drive the sound reception component to move to the stretched position; and when the sound reception component moves to the retracted position and the movable seat passes through the triggering position, the force application structure may drive the sound reception component to move to the retracted position.

According to the above earpiece, the force application structure may include a strip-shaped elastic member in a compressed state; the elastic member may be provided with a first end and a second end; the first end may be provided on the housing; the second end may be provided on the movable seat; when the sound reception component moves from the retracted position to the stretched position, or the sound reception component moves from the stretched position to the retracted position, a distance between the first end and the second end may be decreased first and then increased; and when the movable seat is located at the triggering position, the distance between the first end and the second end may reach a minimum.

According to the above earpiece, the force application structure may include a first magnet on the housing and a second magnet on the movable seat; the first magnet and the second magnet may repel each other; when the sound reception component moves from the retracted position to the stretched position, or the sound reception component moves from the stretched position to the retracted position, a distance between the first magnet and the second magnet may be decreased first and then increased; and when the movable seat is located at the triggering position, the distance between the first magnet and the second magnet may reach a minimum.

According to the above earpiece, the earpiece may further include a first fixing member and a second fixing member on the housing; the first fixing member and the second fixing member each may be made of a magnetic material, or the first fixing member and the second fixing member each may have magnetism to attract the second magnet; when the sound reception component is located at the retracted position, a magnetic force may be generated between the first fixing member and the second magnet to fix the sound reception component at the retracted position; and when the sound reception component is located at the stretched position, a magnetic force may be generated between the second fixing member and the second magnet to fix the sound reception component at the stretched position.

According to the above earpiece, the force application structure may include a motor with an output shaft; the movable seat may be provided with a winding portion wound on an outer periphery of the output shaft; the trigger may further include an opening/closing member and a triggering member; the opening/closing member may be provided on the outer periphery of the output shaft and configured to start or stop the motor; the triggering member may be provided on the winding portion and configured to turn on or off the opening/closing member; when the sound reception component moves to the stretched position and the movable seat passes through the triggering position, the triggering member may contact the opening/closing member and turn on the opening/closing member, such that the motor may be started to drive the sound reception component to move to the stretched position; and when the sound reception component moves to the retracted position and the movable seat passes through the triggering position, the triggering member may contact the opening/closing member and turn on the opening/closing member, such that the motor may be started to drive the sound reception component to move to the retracted position.

According to the above earpiece, the movable seat may be of a linear rod-like shape or an arc rod-like shape.

According to the above earpiece, a via hole communicating with the cavity may be formed in the housing, the movable seat may pass through the via hole, and the sound reception component may be provided on the movable seat out of the via hole.

According to the above earpiece, the movable seat may be provided at an outer side of the housing.

According to the above earpiece, a sliding track extending along the predetermined path may be provided on the housing, and the sound reception component may be slidably provided on the sliding track.

According to the above earpiece, the sound reception component may include a microphone and a first switch for turning on or off the microphone; when the sound reception component is located at the retracted position, the first switch may be turned off; and when the sound reception component is located at the stretched position, the first switch may be turned on.

According to the above earpiece, the first switch may be a contact switch.

Figure 1:
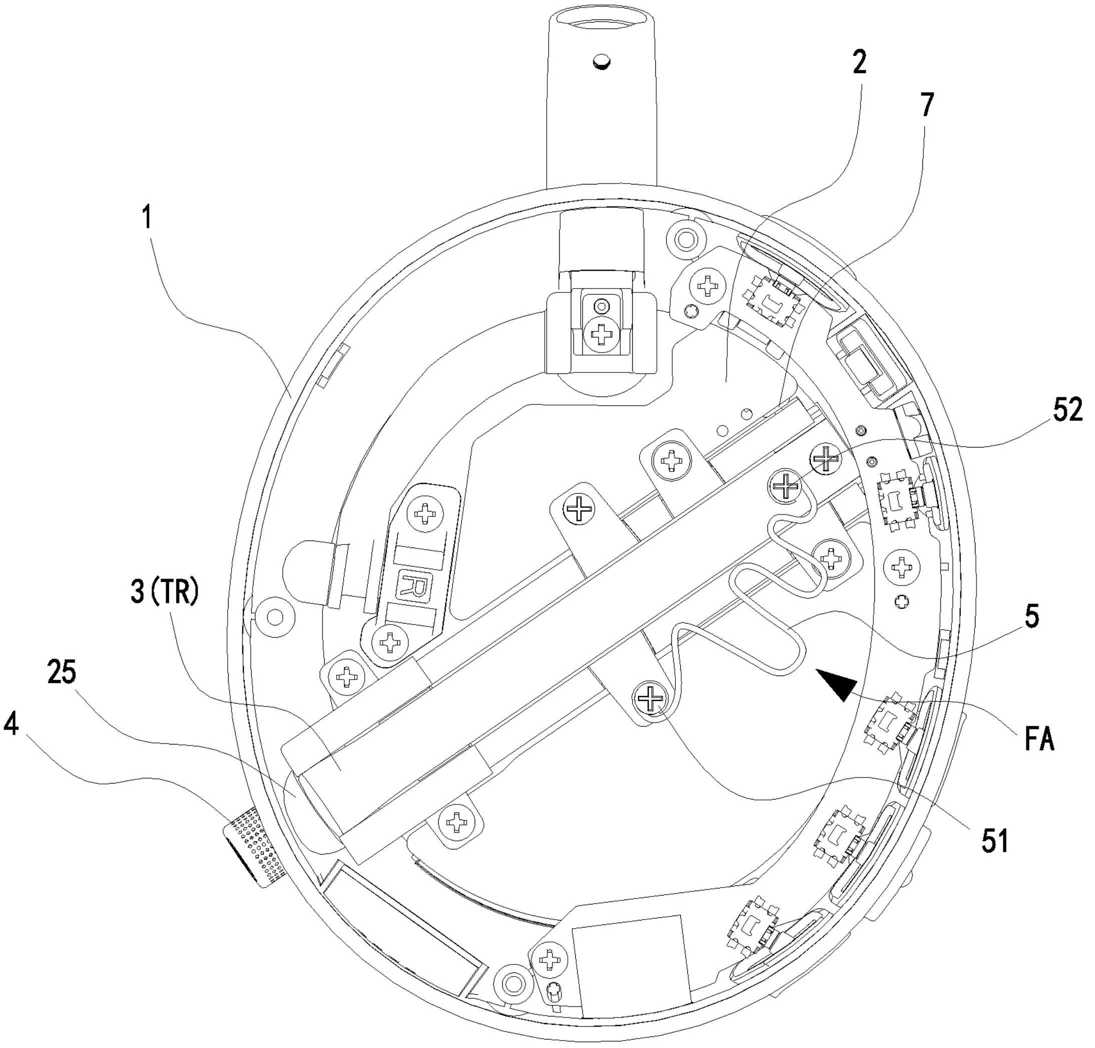
FIG. 1 illustrates an internal structure of an earpiece when a sound reception component is located at a retracted position according to Embodiment 1 of the present disclosure.

In the figure: 1. housing, 2. cavity, 21. first magnet, 22. second magnet, 23. first fixing member, 24. second fixing member, 25. limiting member, 3. movable seat, 31. winding portion, 32. opening/closing member, 33. triggering member, 4. sound reception component, 5. elastic member, 51. first end, 52. second end, 6. sliding track, 7. first switch, 8. sliding frame, 9. via hole, 10. mounting hole, 11. midline, 12. Frankfurt plane, 13. output shaft, 14. base, 15. opening, FA: force application structure, and TR: trigger.

DETAILED DESCRIPTION

The specific implementations of the present disclosure are described in more detail below with reference to the accompanying drawings and embodiments. The following embodiments are used to illustrate the present disclosure, but are not used to limit the scope of the present disclosure.

It should be understood that, in the description of the present disclosure, the terms such as "central", "longitudinal", "transverse", "long", "wide", "thick", "upper", "lower", "front", "back", "left", "right", "vertical", "horizontal", "top", "bottom", "inner", "outer", "clockwise", "anticlockwise", "axial", "radial" and "circumferential" are intended to indicate orientations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure.

Moreover, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure, the term "a plurality of" means two or more, unless otherwise specifically defined.

In the present disclosure, unless otherwise clearly specified, the terms "installation", "interconnection", "connection" and "fixation" are intended to be understood in a broad sense. For example, the connection may be a fixed connection, removable connection or integral connection; may be a mechanical connection or electrical connection; may be a direct connection or indirect connection using a medium; and may be a communication or interaction between two elements. Those of ordinary skill in the art may understand the specific meanings of the above terms in the present disclosure based on specific situations.

In the present disclosure, unless otherwise expressly specified and defined, the expression that a first feature is "above" or "under" a second feature may include that the first feature is in direct contact with the second feature, or that the first feature and the second feature are not in direct contact with each other but are in contact through another feature between them. In addition, the expression that the first feature is "over", "above", and "on" the second feature includes that the first feature is directly above and diagonally above the second feature, or simply indicates that a horizontal height of the first feature is larger than that of the second feature. The expression where the first feature is "beneath", "below", and "under" the second feature includes that the first feature is directly below and diagonally below the second feature, or simply indicates that the altitude of the first feature is lower than that of the second feature.

The present disclosure provides an earpiece, including a housing 1, a sound transmission component, a sound reception component 4, a force application structure FA and a trigger TR. A cavity 2 is formed in the housing 1. The sound transmission component is provided in the cavity 2. The sound reception component 4 is provided on the housing 1, and can move along a predetermined path. At least a retracted position and a stretched position are arranged on the predetermined path. The force application structure FA is connected to the sound reception component 4, and configured to drive the sound reception component 4 to move to the retracted position or the stretched position. The trigger TR is connected to the force application structure FA, and configured to start the force application structure FA, such that the force application structure FA drives the sound reception component 4.

Figure 3:
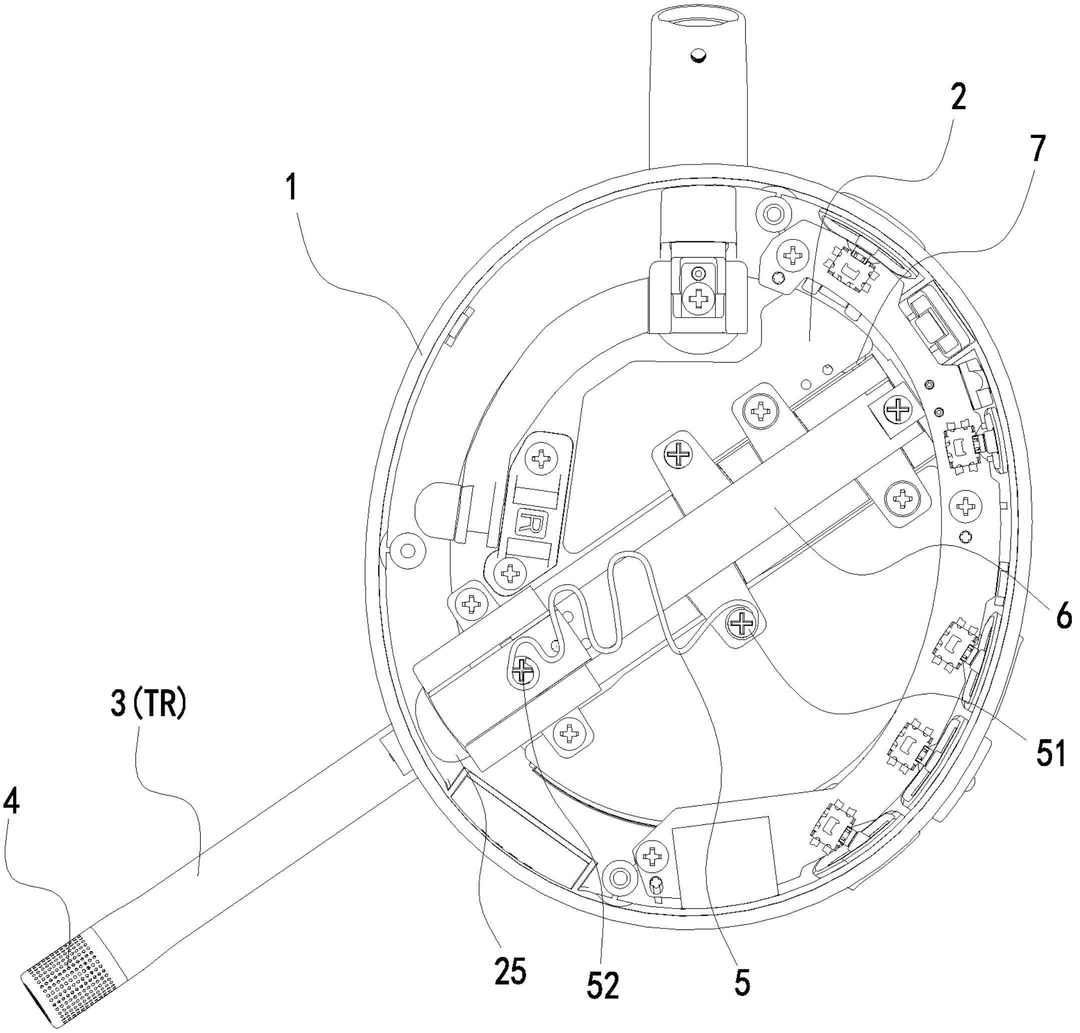
FIG. 3 illustrates an internal structure of an earpiece when a sound reception component is located at a stretched position according to Embodiment 1 of the present disclosure.
Figure 5:
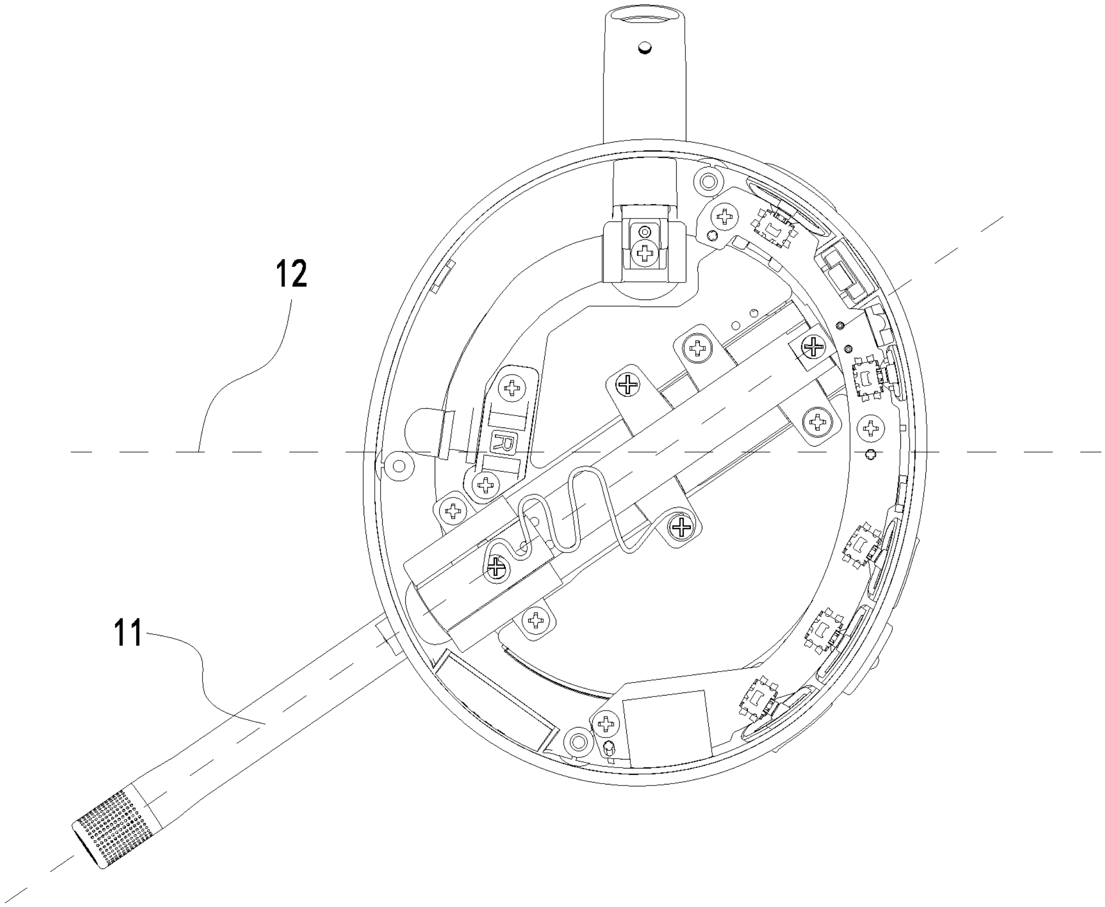
FIG. 5 illustrates a schematic view of a midline and a Frankfurt plane of an earpiece in use according to Embodiment 1 of the present disclosure.
Figure 6:
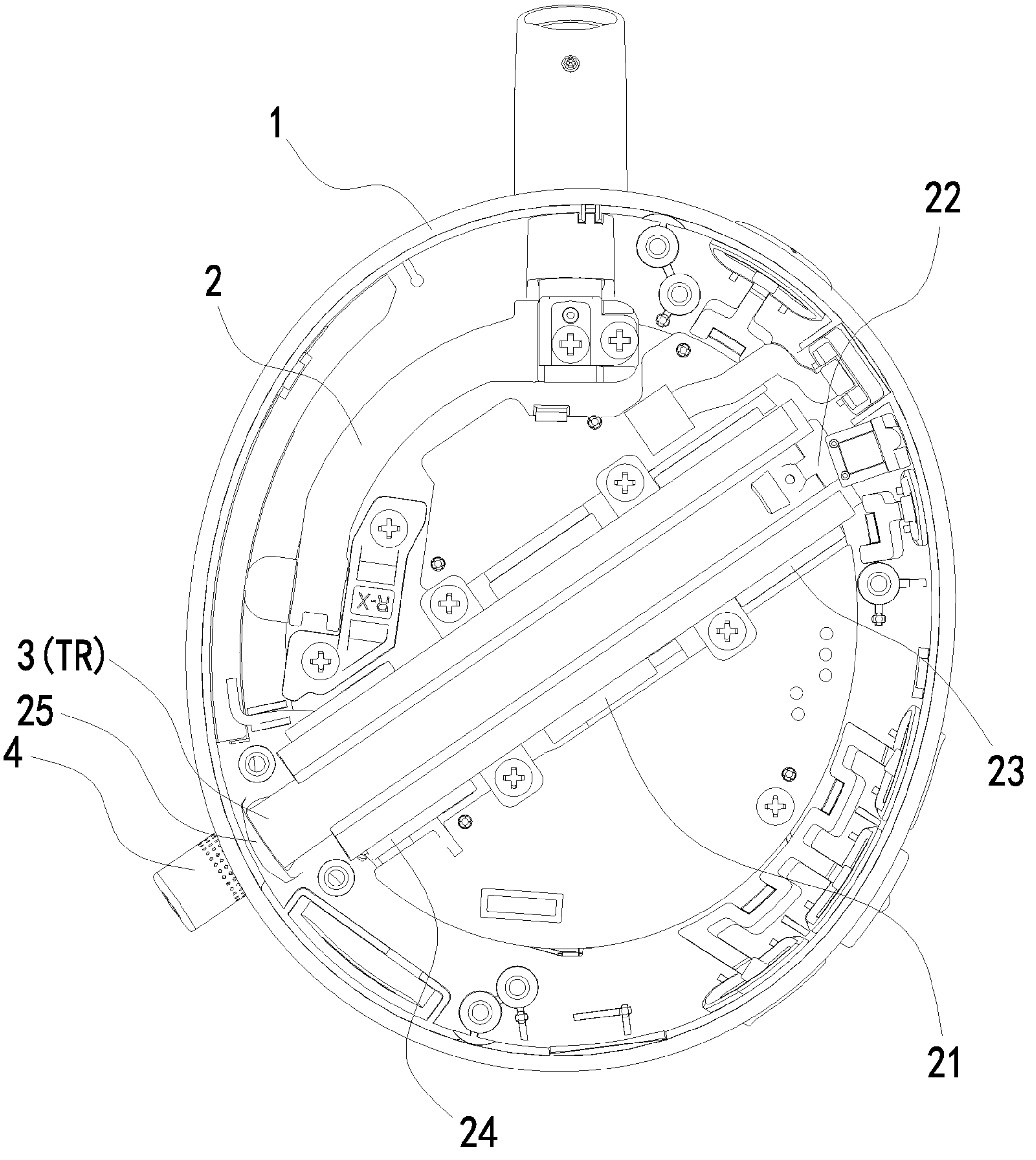
FIG. 6 illustrates an internal structure of an earpiece when a sound reception component is located at a retracted position according to Embodiment 2 of the present disclosure.
Figure 8:
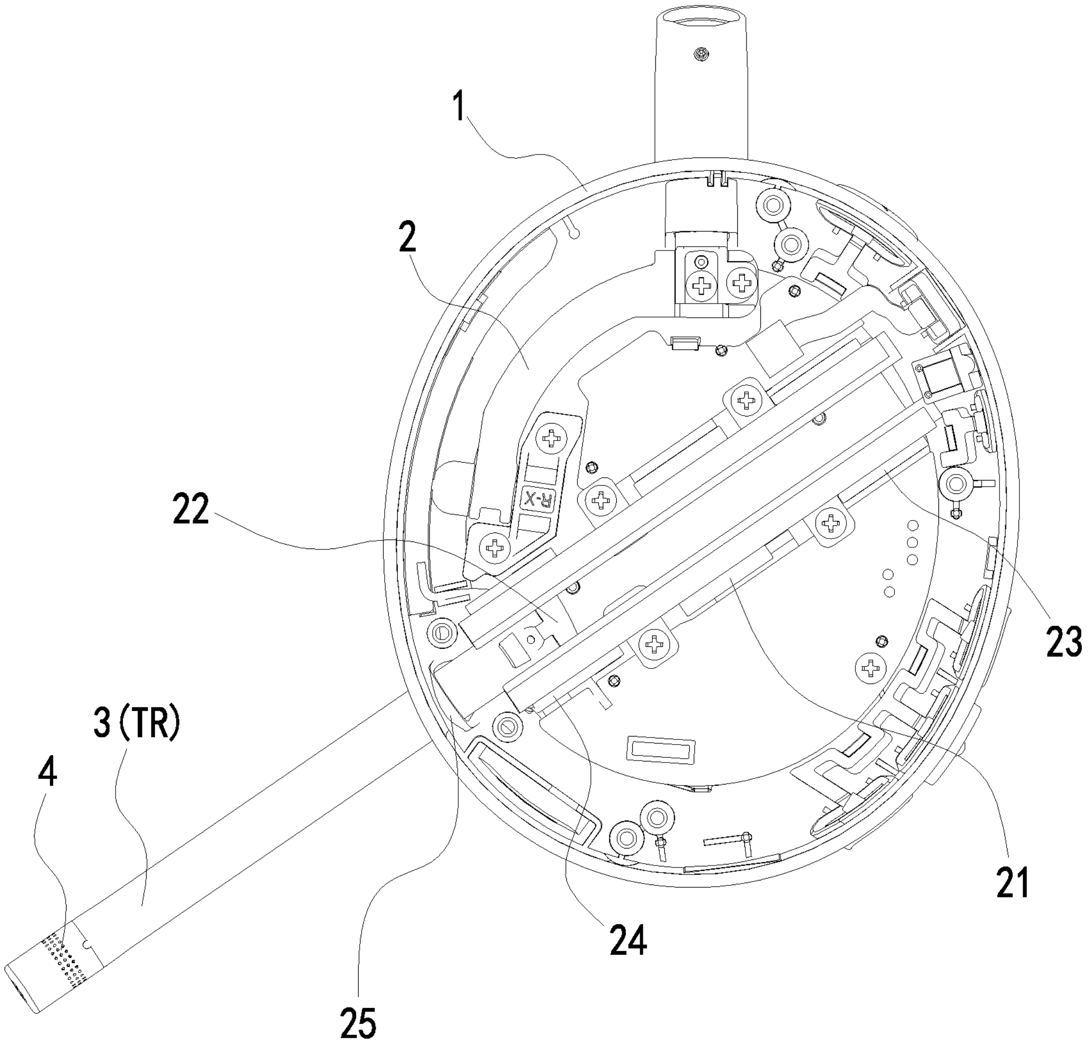
FIG. 8 illustrates an internal structure of an earpiece when a sound reception component is located at a stretched position according to Embodiment 2 of the present disclosure.

When the earpiece provided by some embodiments is used, the housing 1 covers an ear of the user, and the sound transmission component can convert an electrical signal into a sound signal. When the sound reception component 4 is located at the stretched position as shown in FIG. 3, FIG. 5 and FIG. 8, the sound reception component 4 is close to a mouth of the user and can convert a sound signal from the user into an electrical signal. When the sound reception component 4 is located at the retracted position as shown in FIG. 1 and FIG. 6, the sound reception component 4 is retracted to the housing 1, and does not convert the sound signal from the user into the electrical signal, thereby keeping the sound reception component 4 undamaged and the earpiece integrated.

Based on the above solution, when the sound reception component 4 is not used, the force application structure FA can be started by the trigger TR, such that the force application structure FA automatically drives the sound reception component 4 to move to the retracted position. When the sound reception component 4 is used, the force application structure FA can be started by the trigger TR, such that the force application structure FA automatically drives the sound reception component 4 to move to the stretched position. Therefore, the earpiece in some embodiments stretches out or retracts the sound reception component 4 automatically. Compared with an earpiece in which the sound reception component 4 is stretched out or retracted manually by the user to cause the poor user experience in the prior art, the earpiece in some embodiments does not need the user to stretch out or retract the sound reception component 4 manually, with the good user experience.

In an optional implementation, the force application structure FA can stretch out or retract the sound reception component 4 automatically. That is, when the trigger TR is triggered, the force application structure FA can drive the sound reception component 4 from the stretched position to the retracted position or drive the sound reception component 4 from the retracted position to the stretched position. Therefore, the best user experience can be achieved in the optional implementation. Exemplarily, the force application structure FA includes a telescopic rod and a pump for driving the telescopic rod to stretch out or retract linearly. The trigger TR is a button switch electrically connected to the pump. When the sound reception component 4 is located at the retracted position and the trigger TR is pressed by the user, the pump drives the sound reception component 4 through the telescopic rod to move from the retracted position to the stretched position. When the sound reception component 4 is located at the retracted position and the trigger TR is pressed by the user, the pump drives the sound reception component 4 through the telescopic rod to move from the stretched position to the retracted position.

In a preferable implementation, the force application structure FA can stretch out or retract the sound reception component 4 semi-automatically. That is, a middle position is further provided on the predetermined path. When the trigger TR is triggered, the force application structure FA can drive the sound reception component 4 from the middle position to the retracted position or drive the sound reception component 4 from the middle position to the stretched position. Specifically, the trigger TR includes a movable seat 3. The sound reception component 4 is provided on the movable seat 3. The movable seat 3 moves with the sound reception component 4. When the sound reception component 4 moves between the retracted position and the stretched position, the movable seat 3 passes through a triggering position. When the sound reception component 4 moves to the stretched position and the movable seat 3 passes through the triggering position, the force application structure FA drives the sound reception component 4 to move to the stretched position. When the sound reception component 4 moves to the retracted position and the movable seat 3 passes through the triggering position, the force application structure FA drives the sound reception component 4 to move to the retracted position. In the preferable implementation, if there is a need to move the sound reception component 4 at the retracted position to the stretched position or move the sound reception component 4 at the stretched position to the retracted position, the user will apply an external force to the movable seat 3 and moves the movable seat 3 to the triggering position, thus starting the force application structure FA. In the preferable implementation, conditions for triggering the trigger TR are more demanding and the false triggering of the trigger TR can be prevented, though the user experience cannot be optimized.

Preferably, referring to FIG. 5, both the housing 1 and the sound reception component 4 have a centroid, with a midline 11 defined as follows: When the sound reception component 4 is located at the stretched position, a straight line passing through the centroid of the sound reception component 4 and the centroid of the housing 1 is the midline 11.

Referring to FIG. 5, it is assumed that the included angle between the midline 11 and the Frankfurt plane 12 is the predetermined included angle in use. As a standard plane commonly used in research, the Frankfurt plane 12 refers to a plane formed by points on upper margins of external auditory canals at two sides of the skull and a point on a lower margin of the left orbit. The centroid of the housing 1 is located on the Frankfurt plane 12 in use.

Optionally, the predetermined included angle is any value in a range of 35°±15°.

Optionally, assuming that the predetermined included angle is ∠A, then ∠A is given by:

$$\angle A = \sin^{-1}\frac{a}{\sqrt{a^2+b^2}}$$

In the Eq., a is a perpendicular distance between a horizontal plane of human earhole and a horizontal plane of human mouth, and b is a perpendicular distance between a vertical plane of the earhole and a vertical plane of the mouth.

The present disclosure provides the following Embodiment 1 to Embodiment 3. In Embodiment 1 to Embodiment 3, the force application structure FA can stretch out or retract the sound reception component 4 semi-automatically.

Embodiment 1

As shown in FIG. 1 to FIG. 4, the force application structure FA includes a strip-shaped elastic member 5 in a compressed state. The elastic member 5 is provided with a first end 51 and a second end 52. The first end 51 is provided on the housing 1. The second end 52 is provided on the movable seat 3. When the sound reception component 4 moves from the retracted position to the stretched position, or the sound reception component 4 moves from the stretched position to the retracted position, a distance between the first end 51 and the second end 52 is decreased first and then increased. When the movable seat 3 is located at the triggering position, the distance between the first end 51 and the second end 52 reaches a minimum.

In Embodiment 1, when the sound reception component 4 is located at the retracted position, the sound reception component 4 can be kept at the retracted position through the elastic force applied by the elastic member 5 to the sound reception component 4. When the sound reception component 4 is located at the stretched position, the sound reception component 4 can be kept at the stretched position through the elastic force applied by the elastic member 5 to the sound reception component 4.

Figure 2:
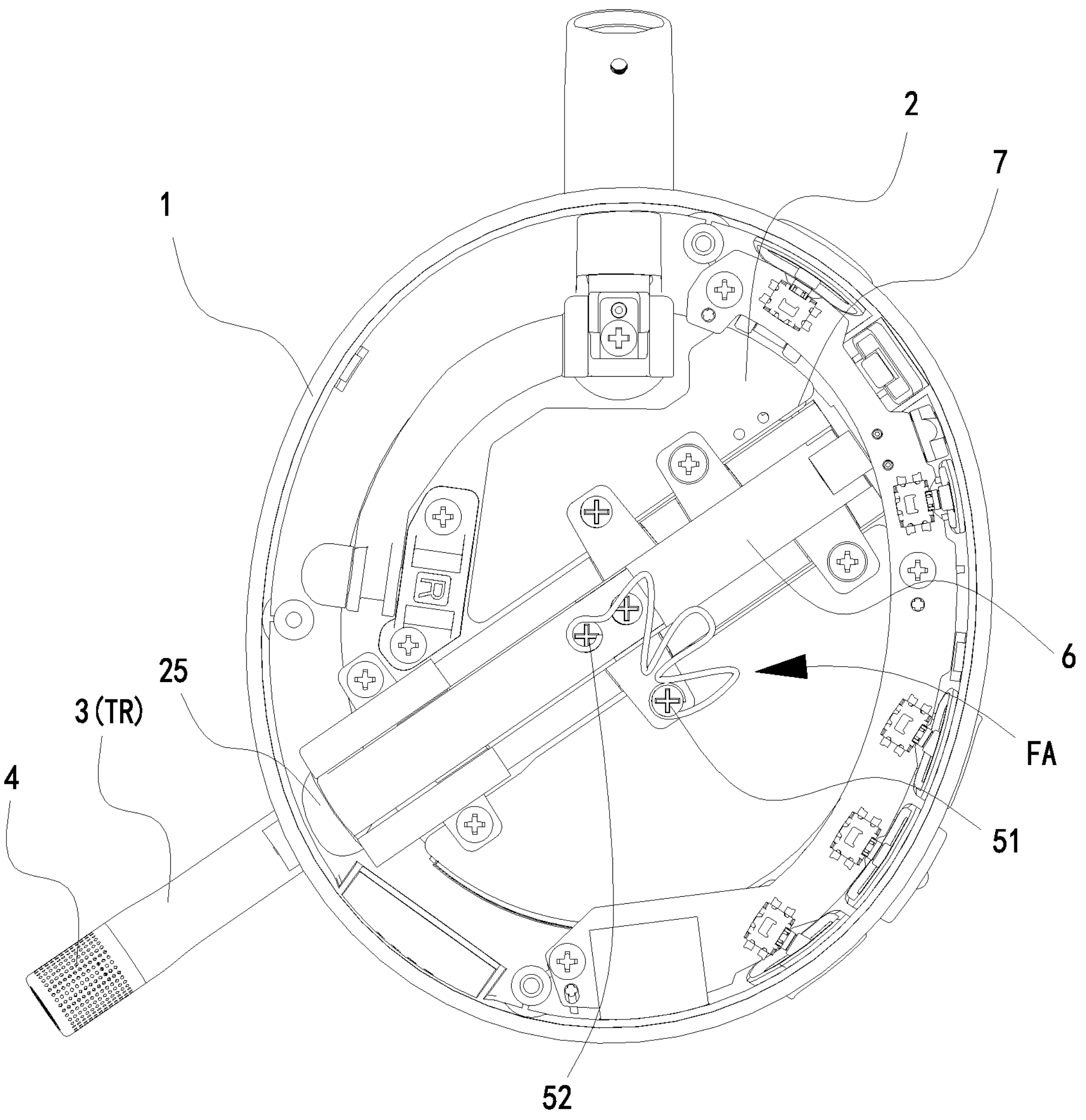
FIG. 2 illustrates a state of an earpiece when a sound reception component is switched between a retracted position and a stretched position according to Embodiment 1 of the present disclosure.

When the sound reception component 4 moves from the retracted position to the stretched position, namely it is switched from the state in FIG. 1 to the state in FIG. 3:

From FIG. 1 to FIG. 2, an external force is applied to the sound reception component 4, such that the sound reception component 4 is driven to move from the retracted position to the stretched position, and the movable seat 3 is driven to move to the triggering position. While the distance between the first end 51 and the second end 52 is gradually decreased, the elastic member 5 is further compressed to prevent the sound reception component 4 from moving.

When the earpiece is located in the state shown in FIG. 2 and the movable seat 3 moves to the triggering position, the distance between the first end 51 and the second end 52 reaches the minimum, namely the elastic member 5 is compressed maximally. The elastic force applied by the elastic member 5 to the sound reception component 4 is perpendicular to the movement direction of the sound reception component 4 and does not prevent the sound reception component 4 from moving.

From FIG. 2 to FIG. 3, as the movable seat 3 passes through the triggering position, the external force may be removed. The elastic member 5 is gradually restored. The sound reception component 4 is driven to continuously move to the stretched position, until the sound reception component 4 reaches the stretched position.

In Embodiment 1, the process that the sound reception component 4 moves from the stretched position to the retracted position is similar to the process that the sound reception component 4 moves from the retracted position to the stretched position, and is specifically described as follows:

From FIG. 2 to FIG. 3, an external force is applied to the sound reception component 4, such that the sound reception component 4 is driven to move from the stretched position to the retracted position, and the movable seat 3 is driven to move to the triggering position. While the distance between the first end 51 and the second end 52 is gradually decreased, the elastic member 5 is further compressed to prevent the sound reception component 4 from moving.

When the earpiece is located in the state shown in FIG. 2 and the movable seat 3 moves to the triggering position, the distance between the first end 51 and the second end 52 reaches the minimum, namely the elastic member 5 is compressed maximally. The elastic force applied by the elastic member 5 to the sound reception component 4 is perpendicular to the movement direction of the sound reception component 4 and does not prevent the sound reception component 4 from moving.

From FIG. 1 to FIG. 2, as the movable seat 3 passes through the triggering position, the external force may be removed. The elastic member 5 is gradually restored. The sound reception component 4 is driven to continuously move to the retracted position, until the sound reception component 4 reaches the retracted position.

Embodiment 2

As shown in FIG. 6 to FIG. 9, the force application structure FA includes a first magnet 21 on the housing 1 and a second magnet 22 on the movable seat 3. The first magnet 21 and the second magnet 22 repel each other. When the sound reception component 4 moves from the retracted position to the stretched position, or the sound reception component 4 moves from the stretched position to the retracted position, a distance between the first magnet 21 and the second magnet 22 is decreased first and then increased. When the movable seat 3 is located at the triggering position, the distance between the first magnet 21 and the second magnet 22 reaches a minimum.

In Embodiment 2, when the sound reception component 4 is located at the retracted position, the sound reception component 4 can be kept at the retracted position through the repulsive force between the first magnet 21 and the second magnet 22. When the sound reception component 4 is located at the stretched position, the sound reception component 4 can be kept at the stretched position through the repulsive force between the first magnet 21 and the second magnet 22.

Figure 7:
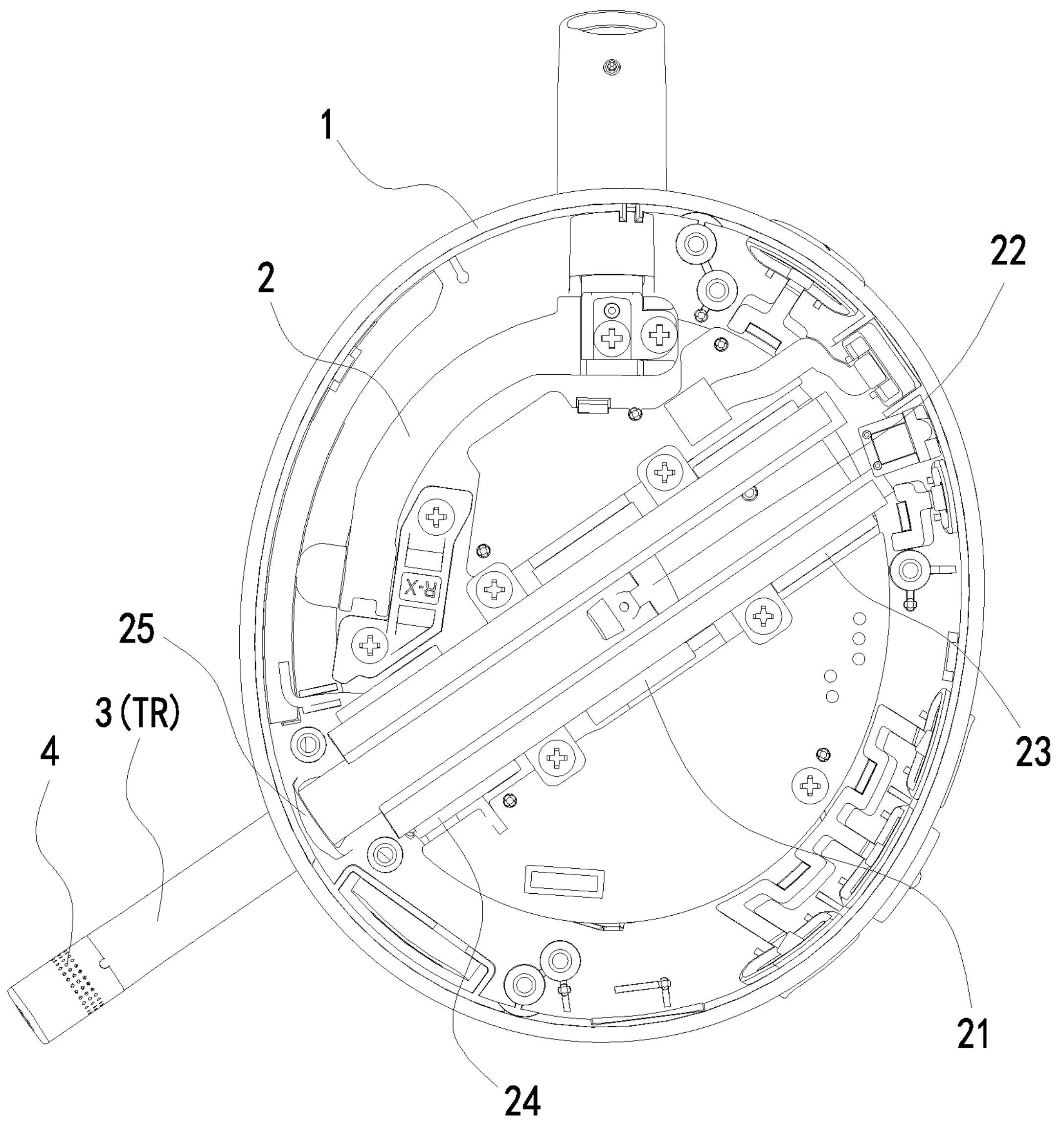
FIG. 7 illustrates a state of an earpiece when a sound reception component is switched between a retracted position and a stretched position according to Embodiment 2 of the present disclosure.

When the sound reception component 4 moves from the retracted position to the stretched position, namely it is switched from the state in FIG. 6 to the state in FIG. 8:

From FIG. 6 to FIG. 7, an external force is applied to the sound reception component 4, such that the sound reception component 4 is driven to move from the retracted position to the stretched position, and the movable seat 3 is driven to move to the triggering position. While the distance between the first magnet 21 and the second magnet 22 is gradually decreased, the repulsive force between the first magnet 21 and the second magnet 22 is increased to prevent the sound reception component 4 from moving.

When the earpiece is located in the state shown in FIG. 7 and the movable seat 3 moves to the triggering position, the distance between the first magnet 21 and the second magnet 22 reaches the minimum. The repulsive force between the first magnet 21 and the second magnet 22 is perpendicular to the movement direction of the sound reception component 4 and does not prevent the sound reception component 4 from moving.

From FIG. 7 to FIG. 8, as the movable seat 3 passes through the triggering position, the external force may be removed. The sound reception component 4 is driven by the repulsive force between the first magnet 21 and the second magnet 22 to continuously move to the stretched position, until the sound reception component 4 reaches the stretched position.

In Embodiment 2, the process that the sound reception component 4 moves from the stretched position to the retracted position is similar to the process that the sound reception component 4 moves from the retracted position to the stretched position, and is specifically described as follows:

From FIG. 7 to FIG. 8, an external force is applied to the sound reception component 4, such that the sound reception component 4 is driven to move from the stretched position to the retracted position, and the movable seat 3 is driven to move to the triggering position. While the distance between the first magnet 21 and the second magnet 22 is gradually decreased, the repulsive force between the first magnet 21 and the second magnet 22 is increased to prevent the sound reception component 4 from moving.

When the earpiece is located in the state shown in FIG. 7 and the movable seat 3 moves to the triggering position, the distance between the first magnet 21 and the second magnet 22 reaches the minimum. The repulsive force between the first magnet 21 and the second magnet 22 is perpendicular to the movement direction of the sound reception component 4 and does not prevent the sound reception component 4 from moving.

From FIG. 6 to FIG. 7, as the movable seat 3 passes through the triggering position, the external force may be removed. The sound reception component 4 is driven by the repulsive force between the first magnet 21 and the second magnet 22 to continuously move to the retracted position, until the sound reception component 4 reaches the retracted position.

When the sound reception component 4 is located at the retracted position or the stretched position, there is a large distance but a small repulsive force between the first magnet 21 and the second magnet 22. In order to further ensure that the sound reception component 4 can be fixed at the stretched position or the retracted position, the earpiece in Embodiment 2 further includes a first fixing member 23 and a second fixing member 24 on the housing 1. The first fixing member 23 and the second fixing member 24 each are made of a magnetic material, or the first fixing member 23 and the second fixing member 24 each have magnetism to attract the second magnet 22. When the sound reception component 4 is located at the retracted position, a magnetic force is generated between the first fixing member 23 and the second magnet 22 to fix the sound reception component 4 at the retracted position. When the sound reception component 4 is located at the stretched position, a magnetic force is generated between the second fixing member 24 and the second magnet 22 to fix the sound reception component 4 at the stretched position.

Optionally, there are a variety of optional positions where the first fixing member 23 is provided on the housing 1, such as a position where the first fixing member 23 can directly contact the second magnet 22 when the sound reception component 4 is located at the retracted position. There are also a variety of optional positions where the second fixing member 24 is provided on the housing 1, such as a position where the second fixing member 24 can directly contact the second magnet 22 when the sound reception component 4 is located at the stretched position.

Embodiment 3

Figure 10:
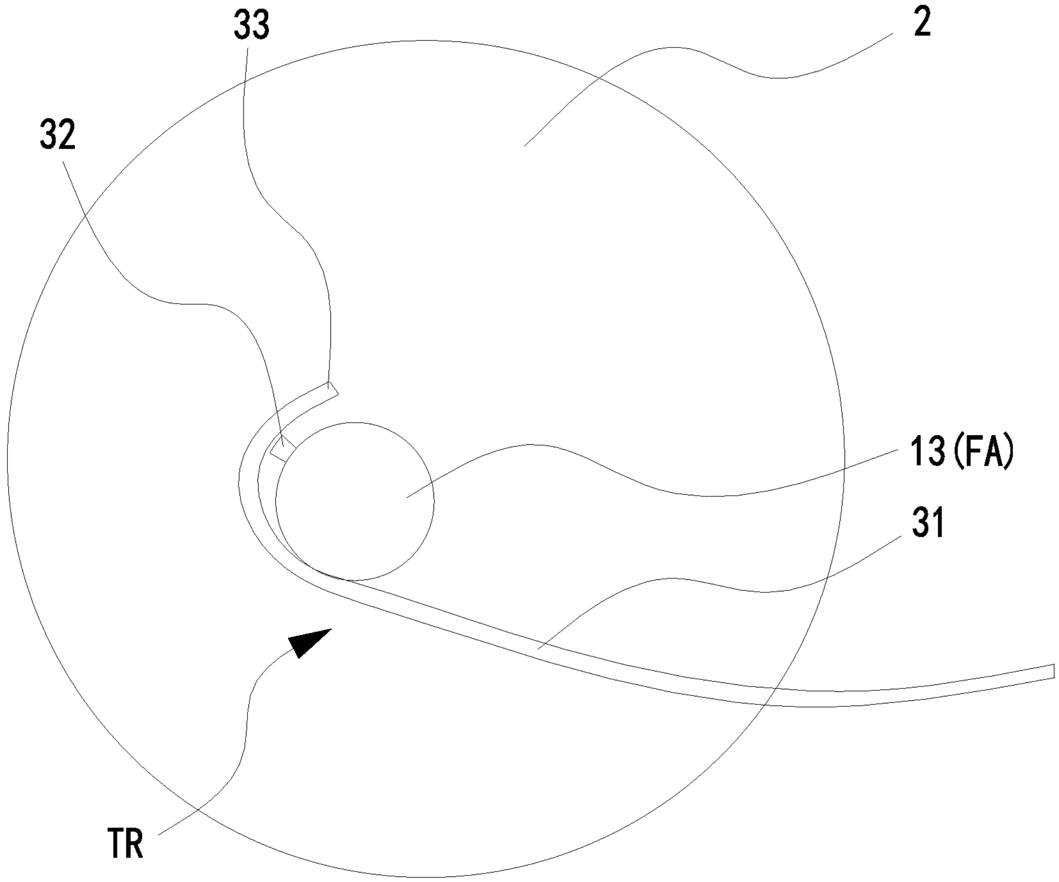
FIG. 10 illustrates a structural view at a motor of an earpiece according to Embodiment 3 of the present disclosure.

As shown in FIG. 10, the force application structure FA includes a motor with an output shaft 13. The movable seat 3 is provided with a winding portion 31 wound on an outer periphery of the output shaft 13. The trigger TR further includes an opening/closing member 32 and a triggering member 33. The opening/closing member 32 is provided on the outer periphery of the output shaft 13 and configured to start or stop the motor. The triggering member 33 is provided on the winding portion 31 and configured to turn on or off the opening/closing member 32. When the sound reception component 4 moves to the stretched position and the movable seat 3 passes through the triggering position, the triggering member 33 contacts the opening/closing member 32 and turns on the opening/closing member, such that the motor is started to drive the sound reception component 4 to move to the stretched position. When the sound reception component 4 moves to the retracted position and the movable seat 3 passes through the triggering position, the triggering member 33 contacts the opening/closing member 32 and turns on the opening/closing member, such that the motor is started to drive the sound reception component 4 to move to the retracted position.

FIG. 10 illustrates a positional relationship among the winding portion 31, the opening/closing member 32, the triggering member 33 and the output shaft 13 when the sound reception component 4 is located at the retracted position.

In Embodiment 3, when the sound reception component 4 is located at the retracted position, the sound reception component 4 can be kept at the retracted position through the static friction force between the winding portion 31 and the output shaft 13. When the sound reception component 4 is located at the stretched position, the sound reception component 4 can be kept at the stretched position through the static friction force between the winding portion 31 and the output shaft 13.

When the sound reception component 4 moves from the retracted position to the stretched position:

An external force is applied to the sound reception component 4, such that the sound reception component 4 is driven to move from the stretched position to the retracted position, and the triggering member 33 on the winding portion 31 is driven to move to the opening/closing member 32. The sliding friction force between the winding portion 31 and the output shaft 13 prevents the sound reception component 4 from moving.

When the triggering member 33 on the winding portion 31 contacts the opening/closing member 32, the opening/closing member 32 is turned on to start the motor.

After the motor is started, the output shaft 13 rotates and drives the sound reception component 4 to continuously move to the stretched position, until the sound reception component reaches the stretched position. In this process, the external force may be removed.

Optionally, the winding portion 31 may be made of a hard material, such that the movable seat 3 can be stretched out or retracted stably along the preset route, and the movable seat 3 is not shaken easily at the stretched position or the retracted position.

In Embodiment 3, the process that the sound reception component 4 moves from the stretched position to the retracted position is similar to the process that the sound reception component 4 moves from the retracted position to the stretched position, and is specifically described as follows:

An external force is applied to the sound reception component 4, such that the sound reception component 4 is driven to move from the retracted position to the stretched position, and the triggering member 33 on the winding portion 31 is driven to move to the opening/closing member 32. The sliding friction force between the winding portion 31 and the output shaft 13 prevents the sound reception component 4 from moving.

When the triggering member 33 on the winding portion 31 contacts the opening/closing member 32, the opening/closing member 32 is turned on to start the motor.

After the motor is started, the output shaft 13 rotates and drives the sound reception component 4 to continuously move to the retracted position, until the sound reception component reaches the retracted position. In this process, the external force may be removed.

Compared with Embodiment 1 and Embodiment 2, the space for providing the motor and the winding portion 31 is large, though the magnetic coil in the sound transmission component and the sound reception component 4 is not affected in some embodiments.

From Embodiment 1, Embodiment 2 and Embodiment 3, the following conclusions can be drawn:

Compared with Embodiment 2, the sound reception component 4 is driven by the elastic force of the elastic member 5 in Embodiment 1, so the cost is low and the magnetic coil in the sound reception component 4 and the sound transmission component is not affected. Compared with Embodiment 3, the earpiece in Embodiment 1 has the short service life, in spite of the simple structure, low cost and small mounting space.

Compared with Embodiment 1, the sound reception component 4 is driven by the repulsive force between the first magnet 21 and the second magnet 22 in Embodiment 2, so the service life is long. Compared with Embodiment 3, the earpiece in Embodiment 2 has the advantages of simple structure, low cost and small mounting space. Nevertheless, the magnetic coil in the sound reception component 4 and the sound transmission component is easily affected in Embodiment 2.

Compared with Embodiment 1, with the use of the motor in Embodiment 3, the force is applied stably and the service life is long. Compared with Embodiment 2, the magnetic coil in the sound reception component 4 and the sound transmission component is not affected in Embodiment 3. Nevertheless, the earpiece in Embodiment 3 has the large mounting space and high cost.

From Embodiment 1 to Embodiment 3, optionally, as shown in FIG. 1 to FIG. 9, the movable seat 3 is of a linear rod-like shape or an arc rod-like shape, and is provided with a first top end and a second top end opposite to each other. The sound reception component 4 is provided on the first top end. In Embodiment 1, the second end 52 is provided on the second top end. In Embodiment 2, the second magnet 22 is provided on the second top end. In embodiment 3, the winding portion 31 is provided on the second top end of the movable seat 3. From Embodiment 1 to Embodiment 3, optionally, as shown in FIG. 1 to FIG. 9, the movable seat 3 may further be of a telescopic rod-like shape. Optionally, when the telescopic rod-like structure is used by the movable seat 3, the movable seat 3 may be of a multi-section telescopic structure.

From Embodiment 1 to Embodiment 3, optionally, as shown in FIG. 1 to FIG. 9, a via hole 9 communicating with the cavity 2 is formed in the housing 1. The movable seat 3 passes through the via hole 9. The sound reception component 4 is provided on the movable seat 3 out of the via hole 9 to implement the concealed mounting of the sound reception component 4, thereby further making the earpiece integrated and better protecting the sound reception component 4.

Figure 11:
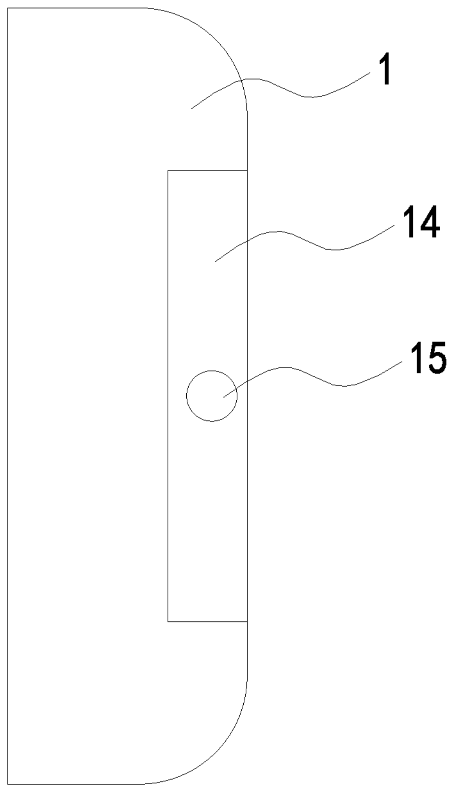
FIG. 11 illustrates a structure in which a microphone boom of an earpiece is provided at an outer side of a housing according to an embodiment of the present disclosure.
Figure 12:
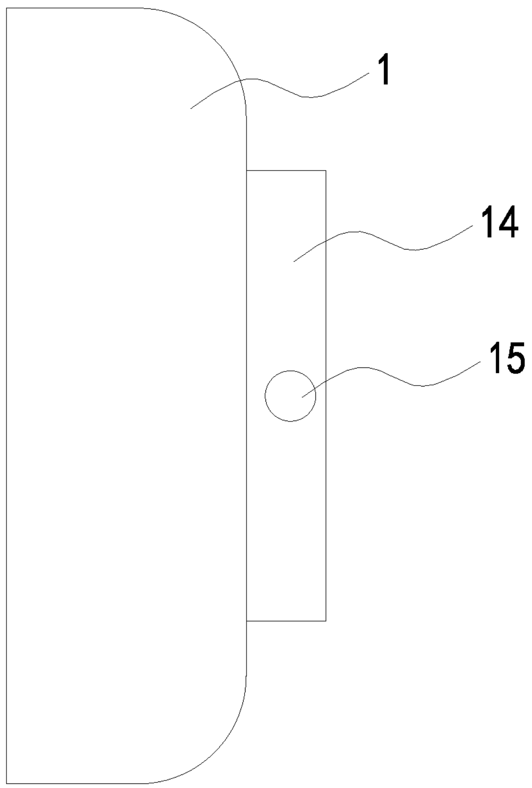
FIG. 12 illustrates another structure in which a microphone boom of an earpiece is provided at an outer side of a housing according to an embodiment of the present disclosure.

From Embodiment 1 to Embodiment 3, optionally, the movable seat 3 is provided at an outer side of the housing 1, which facilitates the subsequent maintenance on the directly exposed movable seat 3, and further facilitates the force application of the user on the sound reception component 4 to stretch out or retract the sound reception component 4, as shown in FIG. 11 and FIG. 12. Specifically, a base 14 is provided at the outer side of the housing 1. An accommodating space is formed in the base 14. An opening 15 communicating with the accommodating space is formed in the base 14. The movable seat 3 passes through the opening, with a part extending to the accommodating space. The sound reception component 4 is provided on the movable seat 3 extending out of the accommodating space. The base 14 may be embedded into the outer side of the housing 1, as shown in FIG. 11. The base 14 may also be directly provided at the outer side of the housing 1, as shown in FIG. 12.

Figure 4:
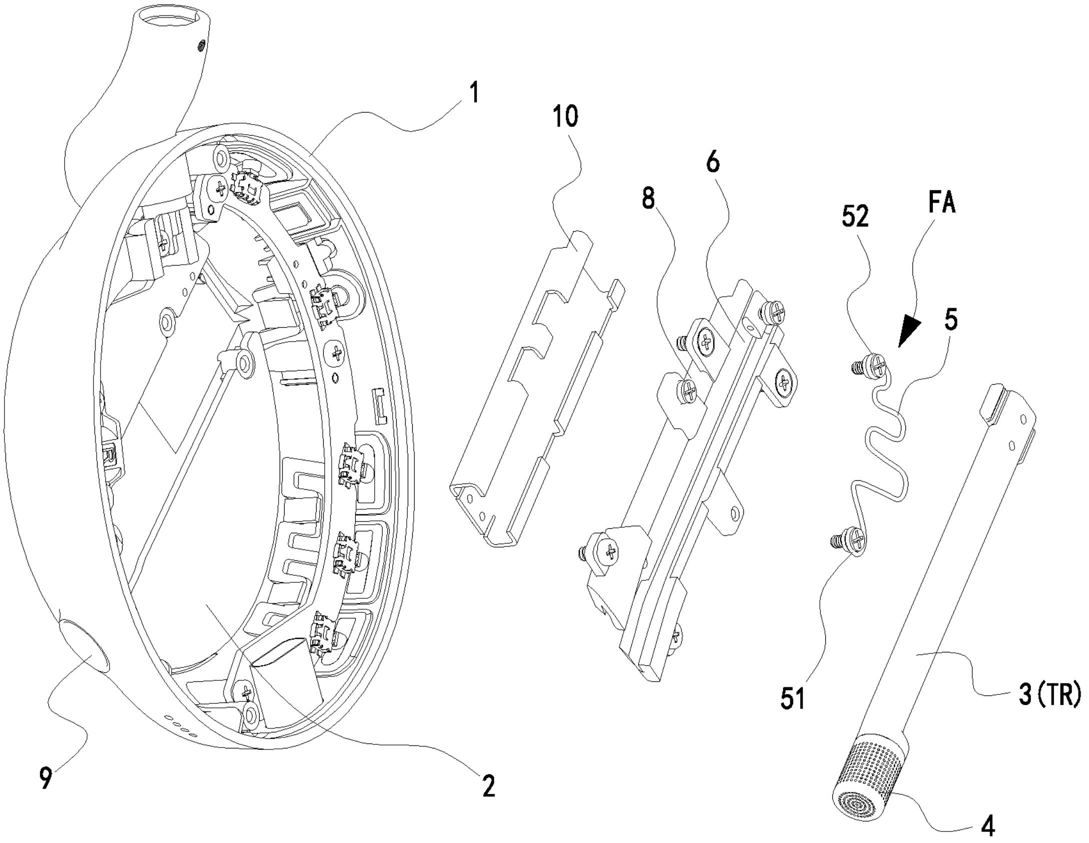
FIG. 4 illustrates a breakdown structure of an earpiece according to Embodiment 1 of the present disclosure.
Figure 9:
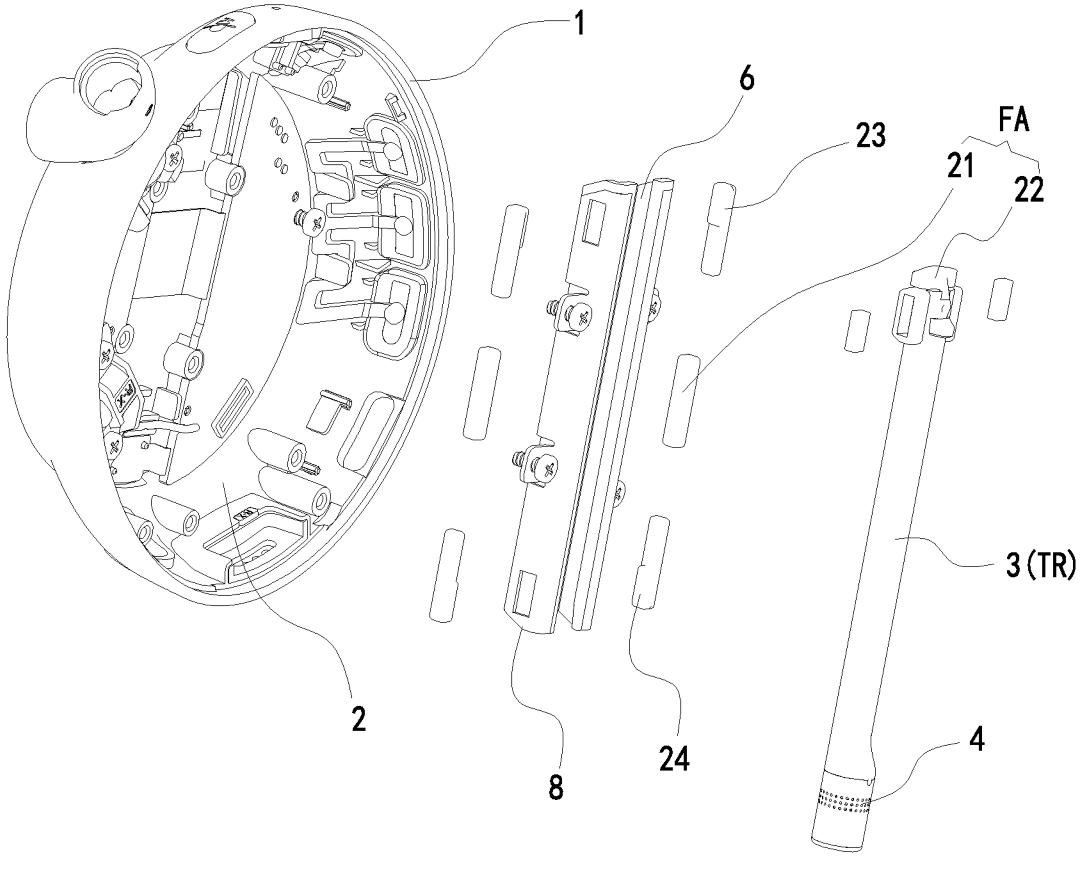
FIG. 9 illustrates a breakdown structure of an earpiece according to Embodiment 2 of the present disclosure.

According to the earpiece provided by the present disclosure, further as shown in FIG. 4 and FIG. 9, a sliding track 6 extending along the predetermined path is provided on the housing 1. The sound reception component 4 is slidably provided on the sliding track 6, which ensures that the sound reception component 4 can be switched between the stretched position and the retracted position along the predetermined path.

Further, the sliding track 6 is defined by a sliding frame 8 on the housing 1. A middle portion of the sliding frame 8 is depressed downward to form the sliding track 6. A plurality of flanges are arranged on the sliding frame 8. The plurality of flanges are provided on the housing 1 through bolts to facilitate assembly and disassembly of the sliding frame 8.

Further, referring to FIG. 4, when the movable seat 3 passes through the via hole 9, a mounting seat 10 is provided on a bottom wall of the cavity 2. A clamping groove for accommodating the sliding frame 8 is formed in the mounting seat 10. The sliding frame 8 is provided on the mounting seat 10 through a bolt and thus is indirectly provided on the housing 1.

According to the earpiece provided by the present disclosure, further referring to FIG. 1 to FIG. 3, the sound reception component 4 includes a microphone and a first switch 7 for turning on or off the microphone. When the sound reception component 4 is located at the retracted position, the first switch 7 is turned off. When the sound reception component 4 is located at the stretched position, the first switch 7 is turned on. Further, the first switch 7 is a contact switch.

Preferably, the earpiece further includes a second switch for turning on or off the sound reception component 4. From Embodiment 1 to Embodiment 3, the second switch may be provided on the movable seat 3 extending out of the cavity 2, and may also be provided on the housing 1. In actual application scenarios, there is a need to intermittently turn on the sound reception component 4 sometimes. It is troublesome and unpractical to turn off the sound reception component 4 each time by retracting the sound reception component 4 to the retracted position, and thus the second switch is provided in some embodiments. By manually turning the sound reception component 4 on or off, the use requirement of intermittently turning on the sound reception component 4 is met, and the use is convenient.

According to the earpiece provided by the present disclosure, further referring to FIG. 1 to FIG. 3 and FIG. 6 to FIG. 8, a limiting member 25 is provided on the housing 1. When the sound reception component 4 moves to the stretched position, the limiting member 25 abuts against the movable seat 3 and limits the movement of the movable seat 3.

In the description of the present specification, the description with reference to the terms "one embodiment", "some embodiments", "an illustrative embodiment", "an example", "a specific example", or "some examples" means that specific features, structures, materials or characteristics described in connection with some embodiments or example are included in at least one embodiment or example of the present disclosure. In this specification, the schematic descriptions of the above terms do not necessarily refer to the same embodiment or example. Moreover, the specific features, structures, materials or characteristics described may be combined in any suitable manner in any one or more embodiments or examples.

Although some embodiments of the present disclosure have been illustrated and described above, those of ordinary skill in the art can understand that various changes, modifications, replacements, and alterations may be made to these embodiments without departing from the principle and tenet of the present disclosure, and the scope of the present disclosure is defined by the claims and equivalents thereof.

The invention claimed is:

1. An earpiece, comprising:

a housing, a cavity being formed in the housing;

a sound transmission component, provided in the cavity;

a sound reception component, provided on the housing and moving along a predetermined path, at least a retracted position and a stretched position being arranged on the predetermined path;

a force application structure, connected to the sound reception component, and configured to drive the sound reception component to move to the retracted position or the stretched position; and a trigger, connected to the force application structure, and configured to start the force application structure, such that the force application structure drives the sound reception component;

wherein the trigger comprises a movable seat;

the sound reception component is provided on the movable seat; the movable seat moves with the sound reception component; and when the sound reception component moves between the retracted position and the stretched position, the movable seat passes through a triggering position;

when the sound reception component moves to the stretched position and the movable seat passes through the triggering position, the force application structure drives the sound reception component to move to the stretched position; and when the sound reception component moves to the retracted position and the movable seat passes through the triggering position, the force application structure drives the sound reception component to move to the retracted position.

2. The earpiece according to claim 1, wherein the force application structure comprises a strip-shaped elastic member in a compressed state; the elastic member is provided with a first end and a second end; the first end is provided on the housing; and the second end is provided on the movable seat;

when the sound reception component moves from the retracted position to the stretched position, or the sound reception component moves from the stretched position to the retracted position, a distance between the first end and the second end is decreased first and then increased; and when the movable seat is located at the triggering position, the distance between the first end and the second end reaches a minimum.

3. The earpiece according to claim 1, wherein the force application structure comprises a first magnet on the housing and a second magnet on the movable seat;

the first magnet and the second magnet repel each other;

when the sound reception component moves from the retracted position to the stretched position, or the sound reception component moves from the stretched position to the retracted position, a distance between the first magnet and the second magnet is decreased first and then increased; and when the movable seat is located at the triggering position, the distance between the first magnet and the second magnet reaches a minimum.

4. The earpiece according to claim 3, further comprising a first fixing member and a second fixing member on the housing, wherein the first fixing member and the second fixing member each are made of a magnetic material, or the first fixing member and the second fixing member each have magnetism to attract the second magnet; and when the sound reception component is located at the retracted position, a magnetic force is generated between the first fixing member and the second magnet to fix the sound reception component at the retracted position; and when the sound reception component is located at the stretched position, a magnetic force is generated between the second fixing member and the second magnet to fix the sound reception component at the stretched position.

5. The earpiece according to claim 1, wherein the force application structure comprises a motor with an output shaft;

the movable seat is provided with a winding portion wound on an outer periphery of the output shaft;

the trigger further comprises an opening/closing member and a triggering member; the opening/closing member is provided on the outer periphery of the output shaft and configured to start or stop the motor; and the triggering member is provided on the winding portion and configured to turn on or off the opening/closing member;

when the sound reception component moves to the stretched position and the movable seat passes through the triggering position, the triggering member contacts the opening/closing member and turns on the opening/closing member, such that the motor is started to drive the sound reception component to move to the stretched position; and when the sound reception component moves to the retracted position and the movable seat passes through the triggering position, the triggering member contacts the opening/closing member and turns on the opening/ closing member, such that the motor is started to drive the sound reception component to move to the retracted position.

6. The earpiece according to claim 1, wherein the movable seat is of a linear rod-like shape or an arc rod-like shape.

7. The earpiece according to claim 1, wherein a via hole communicating with the cavity is formed in the housing, the movable seat passes through the via hole, and the sound reception component is provided on the movable seat out of the via hole.

8. The earpiece according to claim 1, wherein the movable seat is provided at an outer side of the housing.

9. The earpiece according to claim 1, wherein a sliding track extending along the predetermined path is provided on the housing, and the sound reception component is slidably provided on the sliding track.

10. The earpiece according to claim 1, wherein the sound reception component comprises a microphone and a first switch for turning on or off the microphone; when the sound reception component is located at the retracted position, the first switch is turned off; and when the sound reception component is located at the stretched position, the first switch is turned on.

11. The earpiece according to claim 10, wherein the first switch is a contact switch.

12. The earpiece according to claim 1, wherein a sliding track extending along the predetermined path is provided on the housing, and the sound reception component is slidably provided on the sliding track.

13. The earpiece according to claim 2, wherein a sliding track extending along the predetermined path is provided on the housing, and the sound reception component is slidably provided on the sliding track.

14. The earpiece according to claim 1, wherein the sound reception component comprises a microphone and a first switch for turning on or off the microphone; when the sound reception component is located at the retracted position, the first switch is turned off; and when the sound reception component is located at the stretched position, the first switch is turned on.

15. The earpiece according to claim 2, wherein the sound reception component comprises a microphone and a first switch for turning on or off the microphone; when the sound reception component is located at the retracted position, the first switch is turned off; and when the sound reception component is located at the stretched position, the first switch is turned on.

16. The earpiece according to claim 3, wherein the sound reception component comprises a microphone and a first switch for turning on or off the microphone; when the sound reception component is located at the retracted position, the first switch is turned off; and when the sound reception component is located at the stretched position, the first switch is turned on.

17. The earpiece according to claim 14, wherein the first switch is a contact switch.

18. The earpiece according to claim 15, wherein the first switch is a contact switch.

19. The earpiece according to claim 16, wherein the first switch is a contact switch.

* * * * *